(12) United States Patent
Hosokawa et al.

(10) Patent No.: US 7,140,188 B2
(45) Date of Patent: Nov. 28, 2006

(54) GAS TURBINE ENGINE WITH INTAKE AIR FLOW CONTROL MECHANISM

(75) Inventors: Yasufumi Hosokawa, Kakogawa (JP); Makoto Gouda, Himeji (JP); Masahiro Ogata, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 29 days.

(21) Appl. No.: 10/782,793

(22) Filed: Feb. 23, 2004

(65) Prior Publication Data

US 2004/0211165 A1    Oct. 28, 2004

(30) Foreign Application Priority Data

Apr. 28, 2003   (JP)   ............... 2003-124008

(51) Int. Cl.
*F02C 9/20* (2006.01)
(52) U.S. Cl. .................................. 60/794; 415/151
(58) Field of Classification Search ............ 60/39.23, 60/39.27, 726, 794; 415/148, 151
See application file for complete search history.

(56) References Cited

U.S. PATENT DOCUMENTS

| | | | | |
|---|---|---|---|---|
| 3,146,585 A | * | 9/1964 | Gulick | .............. 60/795 |
| 3,975,900 A | * | 8/1976 | Pfefferle | .............. 60/39.23 |
| 4,003,200 A | * | 1/1977 | Zerlauth | .............. 60/779 |
| 4,389,158 A | * | 6/1983 | Nakanishi | .............. 415/148 |
| 5,003,768 A | | 4/1991 | Kappler et al. | |
| 5,896,741 A | | 4/1999 | Etheridge | |
| 6,105,360 A | | 8/2000 | Willis | |

FOREIGN PATENT DOCUMENTS

| | | |
|---|---|---|
| JP | A 57-68526 | 4/1982 |
| JP | A 2001-193480 | 7/2001 |

* cited by examiner

*Primary Examiner*—L. J. Casaregola
(74) *Attorney, Agent, or Firm*—Oliff & Berridge, PLC

(57) ABSTRACT

A gas turbine engine includes: an air flow control system installed in an air intake path for introducing air to a compressor. The air intake path is located outside and upstream with respect to the compressor. The engine also includes intake air flow control means for controlling an intake air flow by operating the air flow control system according to a load of the engine so as to maintain an air-to-fuel ratio in the combustor within a proper range suited to suppress a discharge of an atmospheric pollutant.

12 Claims, 5 Drawing Sheets

GAS TURBINE ENGINE WITH INTAKE AIR FLOW CONTROL MECHANISM

BACKGROUND OF THE INVENTION

1. Field of the Invention

The present invention relates to a gas turbine engine with an intake air flow rate control mechanism for controlling the intake air flow rate according to operational conditions to burn gas.

2. Description of the Related Art

To suppress the discharge of an atmospheric pollutant such as NOx and CO from a gas turbine engine, there are various types of combustors. On the other hand, there is a strong demand from users of gas turbine generators for enlarging the operable load range thereof. However, when an operable load range of a generator is enlarged, the generator may be operated at an air-to-fuel ratio outside the proper range thereof suited to suppress a discharge of an atmospheric pollutant from a gas turbine engine, thereby the prescribed standard of exhaust gas may not be satisfied.

For example, for a gas turbine engine which is provided with a lean premixing combustor, there is a demand from users for extending the lean combustion operational range. To satisfy the demand, it is necessary to reduce the flow rate of air for combustion flowing into the combustor when the load is small. However, a gas turbine engine for a generator is generally operated at a fixed revolving speed, regardless of the magnitude of the load, thereby the air flow is determined without free choice. Thus, it is difficult to enlarge the operational range with satisfying the prescribed exhaust gas standard.

Further, in a gas turbine engine which is provided with a catalytic combustor, to enlarge the turn down ratio of catalytic combustion (same as the air-to-fuel ratio), that is, to reduce the air flow at the time of partial load, an air flow control mechanism for bypassing air so as to prevent a part of air from entering the catalytic combustor is installed in the catalytic combustor. However, the air flow control mechanism is complicated in its structure and expensive and moreover, the combustor is provided with a bypass flow path so that the structure inevitably increases in size.

Further, for the purpose of controlling the exhaust gas temperature of the engine, a gas turbine control unit provided with an inlet guide vane for adjusting the air flow is known (for example, refer to Japanese Patent Laid-Open Publication No. 57-68526).

SUMMARY OF THE INVENTION

An object of the present invention is to provide a gas turbine engine of a simple structure having an intake air flow control mechanism for stably controlling the air flow according to the load of an engine so as to maintain the air-to-fuel ratio of a combustor within a proper range suited to suppress a discharge of an atmospheric pollutant.

To accomplish the above-mentioned object, the present invention is a gas turbine engine includes: a combustor; a compressor for supplying air to the combustor; a turbine driven by gas from the combustor; an air flow control system installed in an air intake path for introducing air to the compressor, the air intake path being located outside and upstream with respect to the compressor; and intake air flow control means for controlling an intake air flow by operating the air flow control system according to a load of the engine so as to maintain an air-to-fuel ratio in the combustor within a proper range suited to suppress a discharge of an atmospheric pollutant.

In such a constitution, the intake air flow to the compressor can be controlled stably according to the load of the engine. Moreover, by the intake air flow control, the air-to-fuel ratio is controlled within a range suited to suppress a discharge of an atmospheric pollutant according to the load of the engine, so that the exhaust gas standard can be satisfied. Further, the air flow control system is installed in the air intake path, which is located outside and upstream with respect to the compressor, so that there is no need to arrange the air flow control system inside the engine, thus a simple structure can be obtained.

Preferably, the gas turbine engine further includes an air intake duct connected to an inlet of the compressor and forming the air intake path, the air flow control system being installed in the air intake duct.

In such a constitution, the air intake duct is connected to the inlet of the compressor as an ancillary element of the main body of the gas turbine engine including the compressor, the combustor, and the turbine, and the air flow control system can be just installed to the air intake duct. Thereby, there is no need to change the structure of the main body of the engine, thus the structure can be simplified and the manufacturing cost can be decreased. Further, only by simply modifying the air intake duct, the air flow control system can be installed to an existing gas turbine engine, so that the cost for modification can be decreased.

Preferably, the air flow control system includes a plurality of variable static vanes arranged in a row.

Preferably, the air flow control system further includes revolving shafts attached to the plurality of variable static vanes, respectively, and air flow control system driving means for revolving the revolving shafts so as to drive the plurality of variable static vanes.

Preferably, the system driving means revolves the revolving shaft synchronously so as to drive the plurality of variable static vanes synchronously.

Preferably, the system driving means includes follower pinions attached to ends of the revolving shafts, respectively, and a rack meshed with the follower pinions so as to revolve the follower pinions synchronously by a back and forth movement thereof.

Preferably, the air intake path can be totally closed by the plurality of variable static vanes.

Preferably, the combustor is a catalytic combustor having a built-in catalyst.

Preferably, the intake air flow control means operates the air flow control system so as to maintain an exit temperature of the catalytic combustor within a predetermined range.

Preferably, the combustor is a premixing combustor having a premixing chamber in which the air-to-fuel ratio is a premixing ratio.

Preferably, the engine is operated at a fixed number of revolutions.

Preferably, the engine is operated so that its number of revolutions is changed depending on the load of the engine load.

Preferably, the combustor is a single can type.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
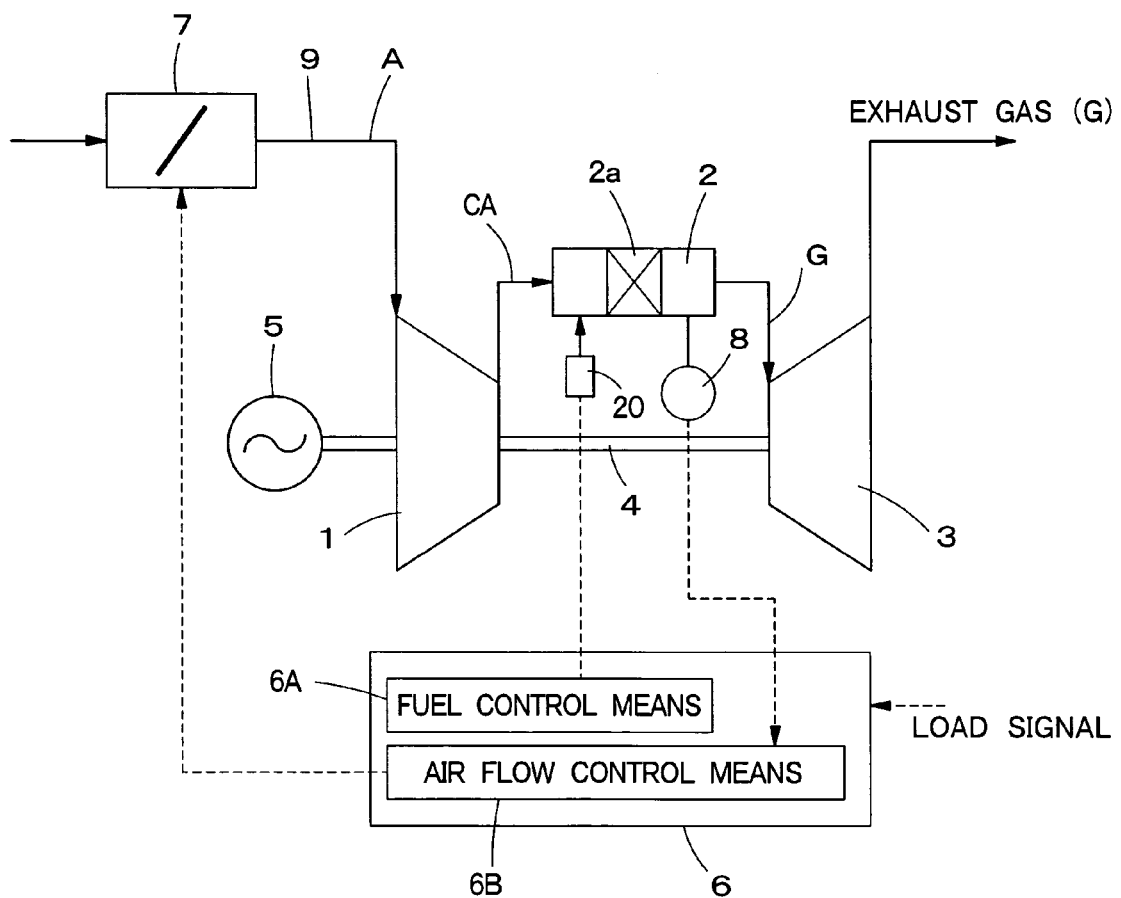
FIG. 1 is a diagram showing the constitution of a gas turbine engine with an intake air flow control mechanism according to the first embodiment of the present invention.

In this first embodiment shown in FIG. 1, the combustor of the gas turbine engine is a catalytic combustor having a built-in catalyst.

The gas turbine engine of the present embodiment has a compressor 1 for sucking in and compressing air A, a catalytic combustor 2 with a built-in catalyst 2a for feeding fuel to compressed air CA compressed by the compressor 1 and burning it in the catalyst 2a, and a turbine 3 to be rotated by combustion gas G generated by the catalytic combustor 2. The compressor 1 connected to the turbine 3 via a revolving shaft 4 and a generator 5 as an example of a rotation load are driven by the rotation of the turbine 3. The combustion gas G passes through the turbine 3 and is discharged outside as exhaust gas. In the intake air flow path for feeding the air A to the compressor 1, an air flow control system 7 is installed.

An engine control unit 6 controls the engine so as to maintain the air-to-fuel ratio of the catalytic combustor 2 within the proper range suited to suppress a discharge of an atmospheric pollutant, that is, the air-to-fuel ratio best or nearly best suited to suppress an atmospheric pollutant such as NOx and CO contained in exhaust gas (combustion gas G) from the catalytic combustor 2. The engine control unit 6 includes a fuel control means 6A and an air flow control means 6B.

The fuel control means 6A receives a load signal of the gas turbine engine and performs the control operation based on the load signal. The load signal is an external signal requiring a certain magnitude of output (for example, a demand of a factory). A fuel having a flow rate necessary to generate the output, upon receipt of a signal from the fuel control means 6A, is fed from a fuel ejecting nozzle 20 to the catalytic combustor 2. The revolving shaft 4 rotates at a fixed number of revolutions, regardless of the level of the load signal (output).

When the output is determined as mentioned above, the fuel flow necessary for combustion is determined. Then, the opening of the air flow control system 7 is adjusted by the air flow control means 6B in order that the air flow rate according to the target air-to-fuel ratio is sucked in the compressor 1. By adjustment of the opening of the air flow control system 7, the air flow is adjusted so that the air flow according to the air-to-fuel ratio is fed to the compressor 1.

The combustion state of the catalytic combustor 2 is always monitored by a thermometer 8 installed at the exit of the catalytic combustor 2. The opening of the air flow control system 7 is controlled, if necessary, so as to set the catalyst exit temperature to a preset target value. When the catalyst exit temperature is higher than the target value, the opening of the air flow control system 7 is enlarged to increase the air flow to be fed to the catalytic combustor 2. On the other hand, when the catalyst exit temperature is lower than the target value, the opening of the air flow control system 7 is narrowed to decrease the air amount to be fed to the catalytic combustor 2. By doing this, the combustion of the catalytic combustor 2 is always carried out stably at an air-to-fuel ratio within the proper range suited to suppress a discharge of an atmospheric pollutant, and an atmospheric pollutant in exhaust gas can be reduced effectively. Due to deterioration by aging of the catalyst 2a in the catalyst combustor 2, the proper range of an air-to-fuel ratio may be slightly changed.

Figure 2:
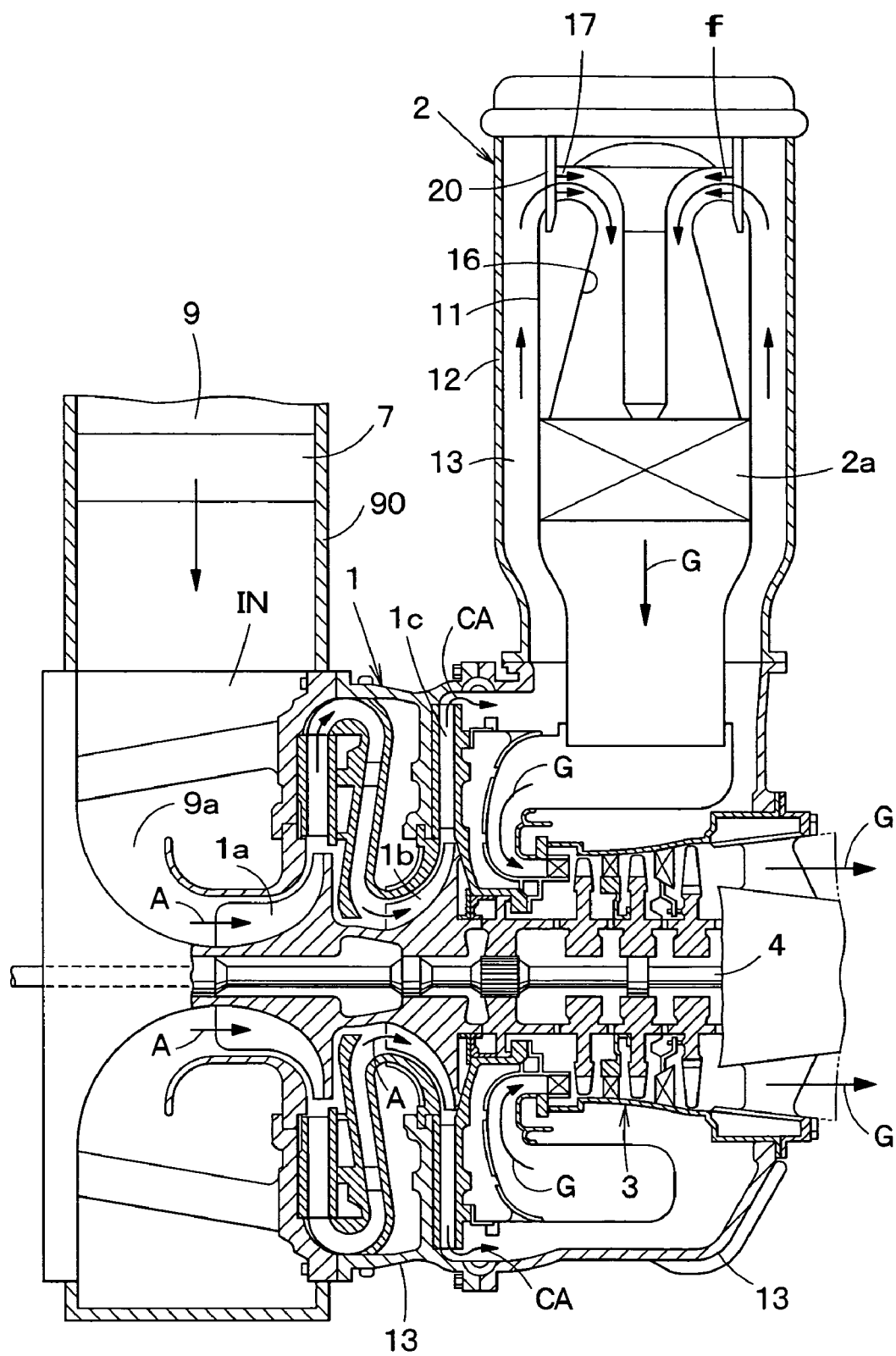
FIG. 2 is a vertical sectional view showing the gas turbine engine.

FIG. 2 is a vertical sectional view of the gas turbine engine shown in FIG. 1. The body of the gas turbine engine has the two-stage centrifugal compressor 1 for sucking in and compressing the air A from an air intake inlet IN, the catalytic combustor 2, and the turbine 3. The compressor 1 and the turbine 3 are stored in a housing 13 and the combustion gas G generated by the catalytic combustor 2 is introduced into the turbine 3 to rotate the turbine 3.

The catalytic combustor 2 is of a single can type and is put in substantially the radial direction of the turbine 3. The combustor 2 has an inner cylinder 11 having the built-in catalyst 2a and an outer cylinder 12 for covering the outer peripheral part and top of the inner cylinder 11. Between the inner cylinder 11 and the outer cylinder 12, an air flow path 13 for introducing the compressed air CA from the compressor 1 in the opposite direction of the flow direction of the combustion gas G in the inner cylinder 11 is formed. The compressed air CA fed from the compressor 1 flows in the air flow path 13 toward the top of the combustor 2 and is introduced downward from a flow inlet 17 installed on the upper part of the inner cylinder 11 to the center side of the combustor 2.

On the upstream side of the flow inlet 17, a plurality of fuel ejecting nozzles 20 for ejecting the main fuel f are installed and the fuel f having a flow rate depending on the load is fed to the combustor 2 from the fuel nozzles 20. Air and the fuel f are fed from the flow inlet 17 in this way, pass through a flow path 16 following the flow inlet 17, are mixed and fed to the catalyst 2a, and burn by the catalyst reaction of the catalyst 2a.

The compressor 1 has a first rotor 1a constituting the first compression step and a second rotor 1b constituting the second compression step and feeds the air A to the combustor 2 via a diffuser 1c. To the air intake inlet IN of the compressor 1, an air intake duct 90 forming an air intake path 9 is connected. The air flow control system 7 is installed inside the air intake duct 90.

Figure 3A:
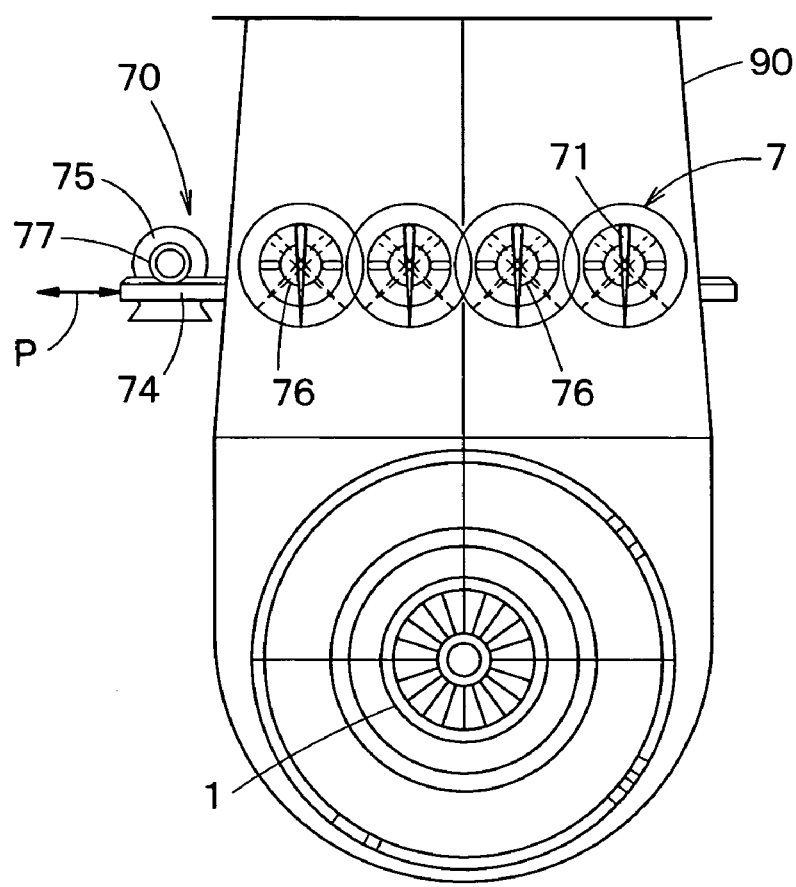
FIG. 3A is an enlarged sectional view of the essential section of the mounting structure of a flow control system which is viewed from the front.
Figure 3B:
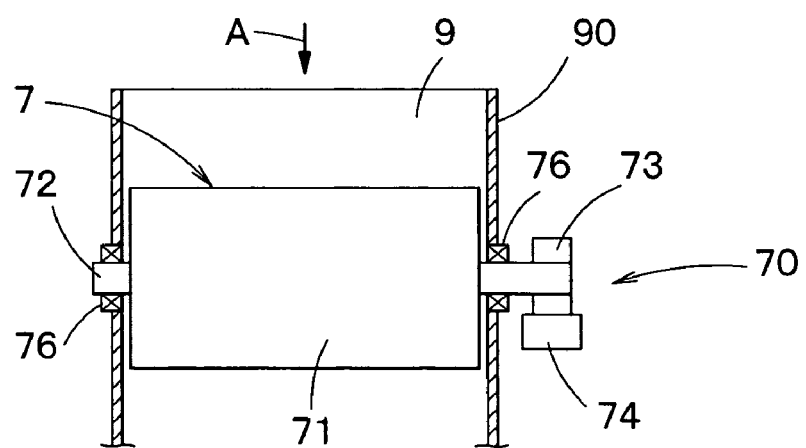
FIG. 3B is a vertical sectional view showing the flow rate control valve.

As shown in FIG. 3A, the air flow control system 7 has a plurality of variable static vanes 71 arranged in the air intake duct 90 and a revolving shaft 72 thereof is supported on the duct wall by a bearing 76 in a rotary state. In a drive device 70 of the air flow control system 7, at one end of the revolving shaft 72, a follower pinion 73 shown in FIG. 3B is attached and is meshed with a rack 74. The rack 74 is meshed with a drive pinion 77 driven by a motor 75 shown in FIG. 3A, and the rack 74 moves back and forth in the longitudinal direction P thereof by the rotation of the motor 75, thus the variable static vanes 71 are rotated synchronously. By this rotation, the angle of the variable static vanes 71 can be changed continuously, and thereby, the air flow passing through the air intake duct 90 can be controlled. For example, when the variable static vanes 71, as indicated by solid lines in FIG. 3A, are all lined up vertically (up-and-down direction), the vanes are put into a totally-opened state, and the intake air flow is maximized. When the variable static vanes 71, as indicated by dashed lines in FIG. 3A, are all inclined, the air intake flow is decreased. Further, when the variable static vanes 71 are all lined up sideways, the vanes are put into almost a totally-closed state in which the air intake path 9 is totally closed. In this state, when the engine is stopped, dust can be prevented from entering the compressor 1.

The control of the air flow by adjusting the opening of the air flow control system 7 is executed by controlling the rotation of the motor 75 (FIG. 3A) by the air flow control means 6B which is a controller shown in FIG. 1. The flow control system 7 is driven so as to maintain the air-to-fuel ratio of the combustor 2 within the proper range suited to suppress a discharge of an atmospheric pollutant according to the load of the engine to control the intake air flow.

Next, the operation of the gas turbine engine with an intake air flow control mechanism having the above-mentioned constitution will be explained. To receive an external load signal and operate the gas turbine engine at an output coincident with the load, the fuel control means 6A of the engine control unit 6 determines the fuel flow and controls the fuel nozzles 20 so as to obtain the determined fuel flow. On the other hand, the catalyst exit temperature of the catalytic combustor 2 is monitored with the thermometer 8, and the opening of the air flow control system 7 is controlled by a signal from the air flow control means 6B in the engine control unit 6 so as to set the catalyst exit temperature to the target value. When the catalyst exit temperature is higher than the target value, the opening of the air flow control system 7 is enlarged to increase the air flow to be fed to the catalytic combustor 2. When the catalyst exit temperature is lower than the target value, the opening of the air flow control system 7 is narrowed to decrease the air flow to be fed to the catalytic combustor 2. By doing this, the combustion of the catalytic combustor 2, regardless of the change of the engine load, is always carried out stably at an air-to-fuel ratio within the proper range and discharge of an atmospheric pollutant can be suppressed.

Further, the air flow control system 7 is installed in the intake air flow path 9 connected to the compressor 1, so that there is no need to arrange the air flow control system 7 inside the engine, that is, inside the engine body including the compressor 1, the combustor 2, and the turbine 3, thus a brief structure can be obtained. Particularly, to the air intake duct 90 shown in FIG. 3 which is connected to the inlet of the compressor 1, the air flow control system 7 is attached and the air intake duct 90 is connected to the engine body as an ancillary element, so that if only the air flow control system 7 is improved so as to be installed in the air intake duct 90, there is no need to change the structure of the engine body. Namely, the air flow control system 7 can be additionally installed to an engine body of an existing engine. Therefore, a brief structure can be obtained and the manufacturing cost can be reduced.

Figure 4:
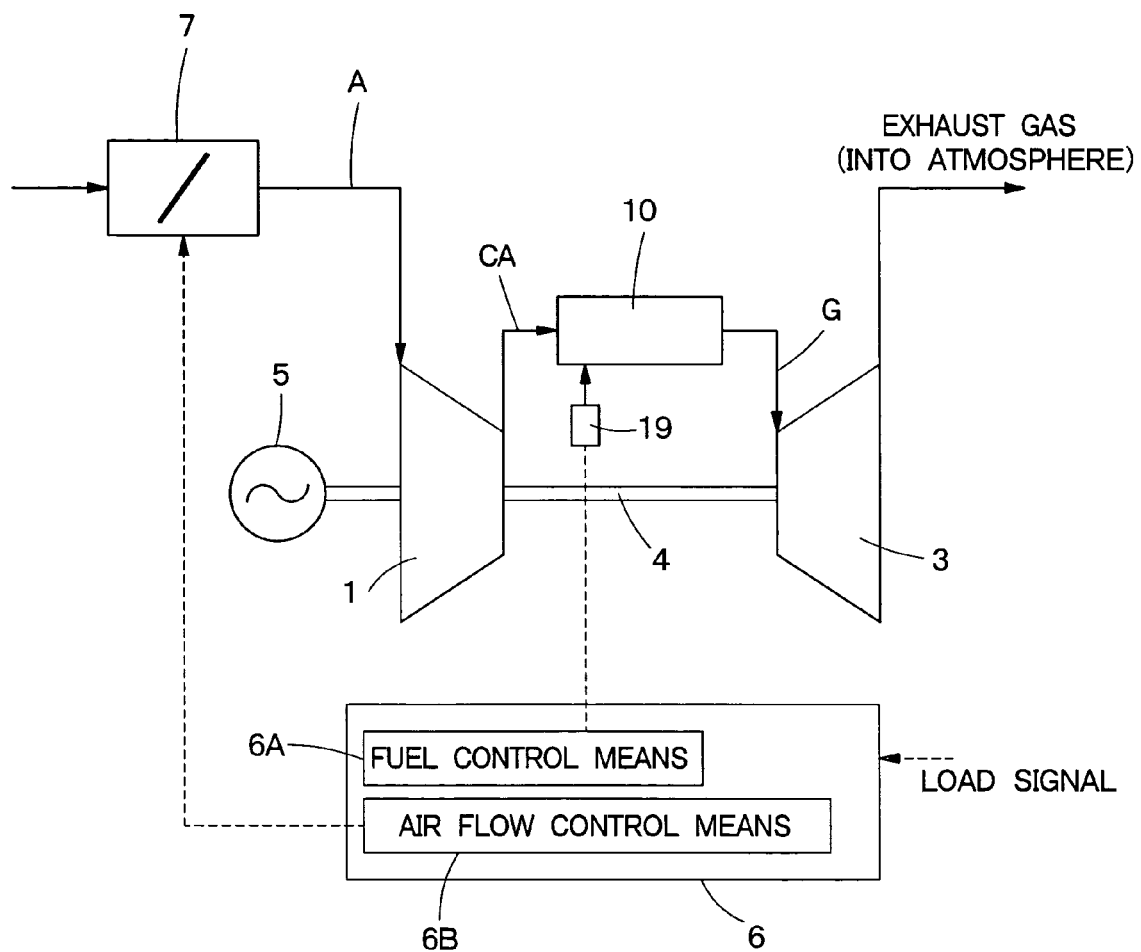
FIG. 4 is a diagram showing the constitution of a gas turbine engine with an intake air flow control mechanism according to the second embodiment of the present invention.

FIG. 4 is a diagram showing the constitution of the gas turbine engine with an intake air flow rate control mechanism according to the second embodiment of the present invention. In this second embodiment, the combustor is a lean premixing combustor 10.

Figure 5:
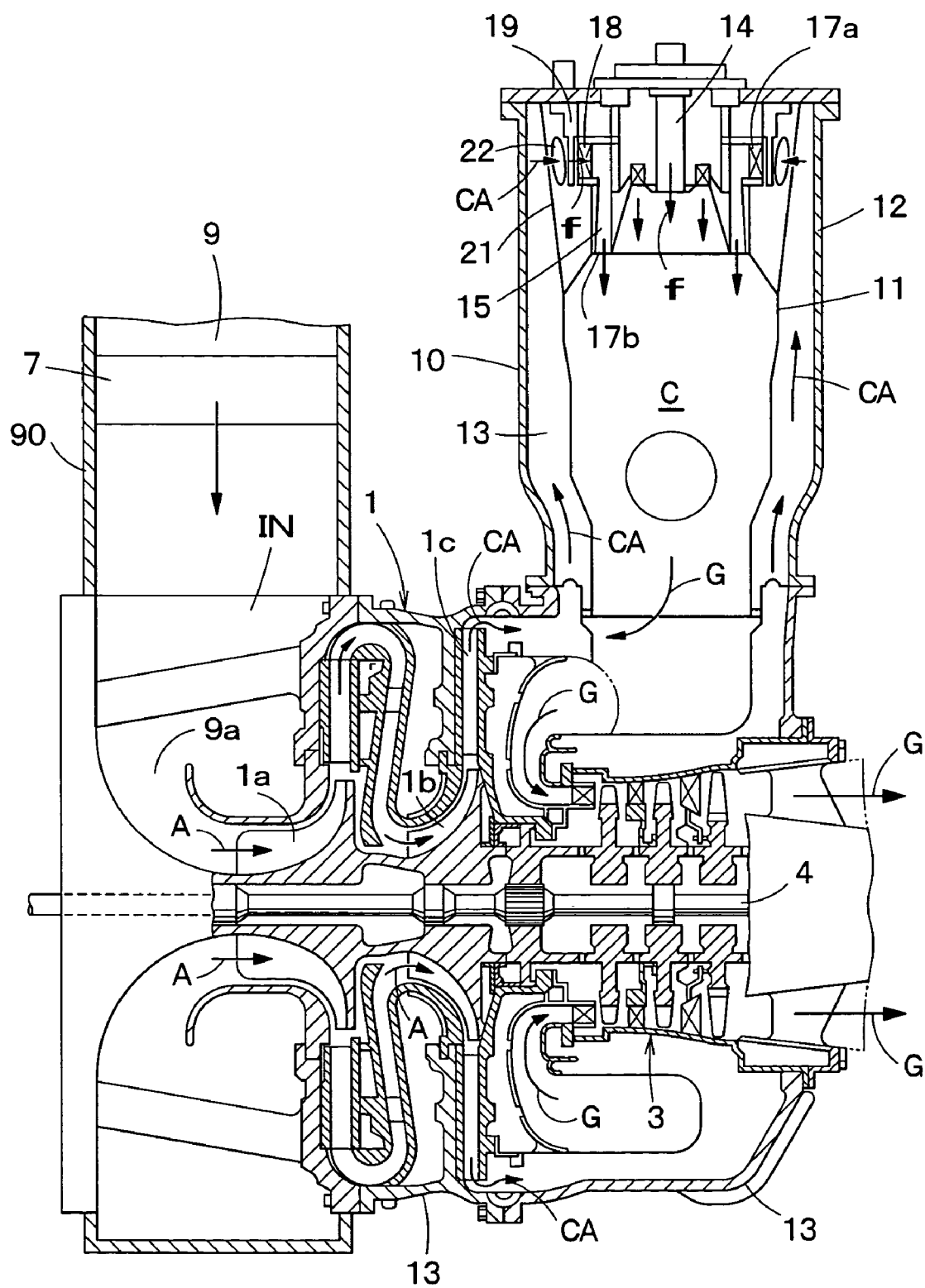
FIG. 5 is a vertical sectional view showing the gas turbine engine.

The premixing combustor 10, as shown in FIG. 5, is also of a single can type, which has the inner cylinder 11 forming a combustion chamber C and the outer cylinder 12 for covering the outer peripheral part and top of the inner cylinder 11. Between the inner cylinder 11 and the outer cylinder 12, the air flow path 13 for introducing the compressed air CA from the compressor 1 in the opposite direction of the flow direction of the combustion gas G in the inner cylinder 11 is formed. The compressed air CA fed from the compressor 1 flows in the air flow path 13 toward the top of the combustor 10 and is introduced from an air introduction inlet 22 formed on a partition cylinder 21 connected to the upper part of the inner cylinder 11 to the center side of the combustor 10. At the central part of the top of the premixing combustor 10, the pilot nozzle 14 for ejecting the fuel f is installed and on the outer periphery of the pilot nozzle 14, a ring premixing chamber 15 is installed. The premixing chamber 15 has a ring air flow inlet 17a directed outside in the radial direction of the inner cylinder 11 to face the air introduction inlet 22. At the ring air introduction inlet 17a, a radial swirler 18 for giving a swirl flow to the combustion air CA flowing in from the air flow path 13 via the air introduction inlet 22 is mounted. An exit 17b of the premixing chamber 15 is directed in the axial direction of the inner cylinder 11, that is, in the axial direction of the combustor and the vertical section thereof including the shaft center is in an L shape.

On the upstream side of the swirler 18 on the top of the premixing chamber 15, a plurality of fuel ejecting nozzles 19 for ejecting the main fuel f for premixing is installed in the premixing chamber 15. The flow of the fuel f to be ejected in the premixing chamber 15 from the fuel ejecting nozzles 19 is determined on the basis of a required output (engine load) by the fuel control means 6A of the engine controller 6 shown in FIG. 4. Similarly, the air flow control system 7 is driven to control the intake air flow by an output signal from the air flow control means 6B. By doing this, air to be fed into the premixing chamber 15 is controlled to a flow rate at an air-to-fuel ratio (premixing ratio) within the proper range.

Premixed gas mixed at the premixing ratio in the premixing combustor 10 enters and burns in the combustion chamber C and suppresses a discharge of an atmospheric pollutant in the exhaust gas G.

Further, in the above embodiments, the gas turbine engine operated at a fixed number of revolutions for driving the generator 5 shown in FIG. 1 has been explained. However, the present invention can be also applied to a gas turbine engine whose number of revolutions is changed depending on the engine load. Further, the shape of the combustor is not limited to the single can type and the present invention can be also applied to combustors in other shapes.

As mentioned above, according to the present invention, the intake air flow into the compressor is controlled according to the load of the engine so as to maintain the air-to-fuel ratio of the combustor within the proper range suited to suppress a discharge of an atmospheric pollutant. By doing this, an atmospheric pollutant in exhaust gas can be reduced and an operation with good thermal efficiency can be performed. Further, the air flow control system is installed in the intake air flow path to the compressor, so that there is no need to arrange it in the engine, thus a brief structure can be obtained.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A gas turbine engine comprising:
   a combustor;

a compressor for supplying air to said combustor;

a turbine driven by gas from said combustor;

an air flow control system installed in an air intake path for introducing air to said compressor, said air intake path being located outside and upstream with respect to said compressor;

intake air flow control means for controlling an intake air flow by operating said air flow control system according to a load of said engine so as to maintain an air-to-fuel ratio in said combustor within a proper range suited to suppress a discharge of an atmospheric pollutant: and an air intake duct connected to an inlet of said compressor so as to form said air intake path therein, said air intake duct extending in an axial direction with respect to a centerline of said air intake duct and being disposed substantially perpendicular to an axial direction of said compressor, said air flow control system being installed in said air intake duct.

2. A gas turbine engine according to claim 1, wherein said air flow control system includes a plurality of variable static vanes arranged in a row.

3. A gas turbine engine according to claim 2, wherein said air flow control system further includes revolving shafts attached to said plurality of variable static vanes, respectively, and system driving means for revolving said revolving shafts so as to drive said plurality of variable static vanes.

4. A gas turbine engine according to claim 3, wherein said system driving means revolves said revolving shaft synchronously so as to drive said plurality of variable static vanes synchronously.

5. A gas turbine engine according to claim 4, wherein said system driving means includes follower pinions attached to ends of said revolving shafts, respectively, and a rack meshed with said follower pinions so as to revolve said follower pinions synchronously by a back and forth movement thereof.

6. A gas turbine engine according to claim 2, wherein said air intake path can be totally closed by said plurality of variable static vanes.

7. A gas turbine engine according to claim 1, wherein said combustor is a catalytic combustor having a built-in catalyst.

8. A gas turbine engine according to claim 7, wherein said intake air flow control means operates said air flow control system so as to maintain an exit temperature of said catalytic combustor within a predetermined range.

9. A gas turbine engine according to claim 1, wherein said combustor is a premixing combustor having a premixing chamber in which said air-to-fuel ratio is a premixing ratio.

10. A gas turbine engine according to claim 1, wherein said engine is operated at a fixed number of revolutions per minute.

11. A gas turbine engine according to claim 1, wherein said engine is operated so that its number of revolutions per minute is changed depending on said load of said engine load.

12. A gas turbine engine according to claim 1, wherein said combustor is a single can type.

* * * * *